United States Patent
Hunt

[19]
[11] Patent Number: 5,809,453
[45] Date of Patent: Sep. 15, 1998

[54] METHODS AND APPARATUS FOR DETECTING HARMONIC STRUCTURE IN A WAVEFORM

[75] Inventor: Melvyn John Hunt, Cheltenham, United Kingdom

[73] Assignee: Dragon Systems UK Limited, Cheltenham, England

[21] Appl. No.: 591,766

[22] Filed: Jan. 25, 1996

[30] Foreign Application Priority Data

Jan. 25, 1995 [GB] United Kingdom .................... 9501417

[51] Int. Cl.⁶ ........................................ G10L 1/08
[52] U.S. Cl. ........................ 704/214; 704/208; 704/217
[58] Field of Search ................... 395/2.17, 2.15, 395/2.12, 2.42; 704/208, 206, 207, 203, 233, 211, 214, 216, 217, 218

[56] References Cited

U.S. PATENT DOCUMENTS

| | | | |
|---|---|---|---|
| 3,681,530 | 8/1972 | Manley et al. ......................... | 395/2.12 |
| 4,038,503 | 7/1977 | Moshier ................................. | 395/2.43 |
| 4,211,897 | 7/1980 | Ichikawa et al. ................... | 364/724.08 |
| 4,630,304 | 12/1986 | Borth et al. ............................... | 381/94 |
| 4,802,225 | 1/1989 | Petterson ................................ | 395/2.16 |
| 4,905,285 | 2/1990 | Allen et al. ............................ | 395/2.41 |
| 5,574,823 | 11/1996 | Hassanein et al. .................... | 395/2.17 |

FOREIGN PATENT DOCUMENTS

| | | | |
|---|---|---|---|
| 2 006 493 | 5/1979 | United Kingdom ............. | H04Q 1/46 |
| 2 139 052 | 10/1984 | United Kingdom .............. | G10L 1/02 |

OTHER PUBLICATIONS

E. Chilton et al., "The Spectral Autocorrelation Applied to the Linear Preduction Residual of Speech for Robust Pitch Detection", 1988 IEEE, p. 358, Apr. 1988.

*Primary Examiner*—Richemond Dorvil
*Attorney, Agent, or Firm*—Young & Thompson

[57] ABSTRACT

The periodicity of a signal from a voice channel is determined by sampling the signal, computing the log power spectrum, optionally thresholding and differencing the power spectrum, and then performing an autocorrelation function of limited order to confine the search for periodicity to spans of up to about 400 Hz to 500 Hz.

10 Claims, 6 Drawing Sheets

A. Window a portion of waveform: s(i)

Fig. 2A

B. Compute complex Fourier transform: x(j), y(j)

Fig. 2B

C. Compute log power spectrum: $p(j) = \log(x^2(j) + y^2(j))$

Fig. 2C

D. Threshold the spectrum: $p'(j) = \max\{p(j), t(j)\}$

Fig. 2D

E. Difference the log power spectrum: $d(j) = p'(j) - p'(j-1)$

Fig. 2E

F. Compute autocorrelation: $r(m) = \sum_j d(j) \cdot d(j+m)$

Fig. 2F

G. Extend autocorrelation with zeros:

Fig. 2G

H. Compute cosine transform of extended autocorrelation:

Fig. 2H

I. Find height of peak in cosine transform:

METHODS AND APPARATUS FOR DETECTING HARMONIC STRUCTURE IN A WAVEFORM

BACKGROUND OF THE INVENTION

1. Field of the Invention

This invention relates to methods and apparatus for detecting harmonic structure in a waveform and particularly, but not exclusively, to methods and apparatus for detecting whether a signal sampled from a voice channel contains a harmonic structure indicative of voiced sounds.

2. Description of the Related Art

Acoustic energy in speech can be generated in two different ways. The primary mechanism, known as "voiced" excitation occurs in the larynx. The vocal cords open and close quasi-periodically at an average rate of about 110 Hz for a man and about twice that for a woman. The resulting voiced speech sounds include all vowels (except whispered). The second mechanism for generating acoustic energy in speech uses turbulence resulting from an obstruction created by the tongue or lips, and sounds generated purely in this way are said to be voiceless.

Voiceless speech is hard to distinguish from background noise. Consequently, the most reliable way to determine the presence of speech is to detect voiced speech.

There are many applications where it is useful to distinguish whether a signal contains speech or not; for example "speech chunking" where the signal processor needs to be able to determine the locations of speech and non-speech regions in a recording or transmission. Elsewhere, speech coders or voice coders also need to be able to distinguish voiced speech from voiceless speech and non-speech periods, because voiced speech is synthesized in a different way from other sounds.

It has been proposed to discriminate between speech and non-speech by analysing the waveform for evidence of a harmonic structure indicating the presence of "voiced" sounds in the signal.

We have made several initial attempts to detect harmonic structure but these proposals had various disadvantages which meant that they were not feasible for many applications. Initially we applied a standard cepstrum to the sample signal. In cepstrum processing, the log power spectrum of the sample signal is determined and then a cosine transform is carried out on the log power spectrum to produce a series of cepstrum coefficients which can be regarded as descriptors for the spectrum of the speech signal. The first coefficient represents the total energy of the spectrum, the second coefficient represents the general slope of this spectrum with increase in frequency, and the third and subsequent coefficients represent progressively finer features in the spectrum. We had originally thought that periodicity or harmonicity could be determined by measuring the height of the peak in the cepstrum beyond the quefrency range affected by the shape of the spectrum envelope.

Figure 1:
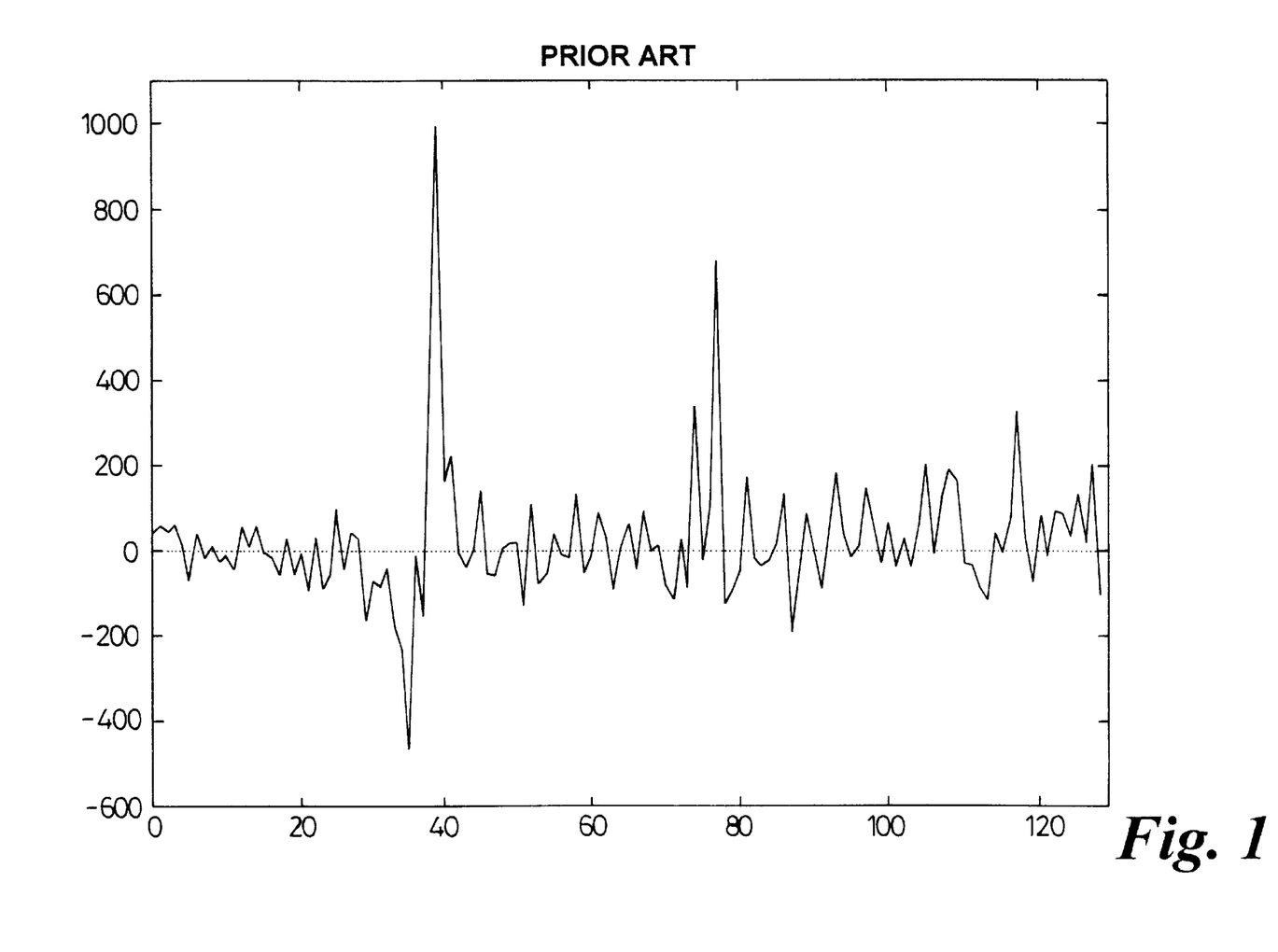
FIG. 1 is a graph of a capstrum produced from the log spectrum of a signal containing voiced sounds.

We tried implementing this technique on a sample taken from a good quality transatlantic telephone call using energy threshold based on typical background noise levels. As a technique for determining the pitch $F_o$, locating the peak in the cepstrum worked well; it could even detect a 120 Hz signal component due to the rectified domestic U.S. electricity supply. However, as a method of detecting harmonic structure, in noisy telephone speech, the peak height in a conventional cepstrum was found to be a poor indicator. FIG. 1 of the accompanying drawings is a plot of a cepstrum produced from a log spectrum of the signal, which shows a first peak due to the harmonic structure, and then a peak of comparable magnitude caused by non-harmonic structure.

In tests using an alphabet, the cepstrum peak heights were typically as large in a period of artificial white noise, and in some voiceless fricatives (in "x", "h", "c", for example), as they were in strong vowels, and thus discriminating on the basis of the peaks in the cepstrum may give erroneous results. It appeared to us that the peak height in the cepstrum seemed to be a measure of energy rather than periodicity.

Increasing the waveform analysis window at 8 kHz from the 160 samples used in the above technique for the mid-cepstrum parameters, to the 256 samples to which it is expanded for the fast Fourier Transform (FFT) improved the $F_o$ analysis markedly, but the response to noise-like signals remained strong. Replacing the log power with cube-root power made the results worse, as did applying a masking threshold that declined exponentially across frequency array from each component in the power spectrum.

We then studied spectrograms generated from the FPT for a recording of a very poor alphabet (i.e. one with a low signal level and very poor signal to voice ratio (SNR)). Although cepstrum analysis was unable to determine periodicity, these spectrograms showed in most vowels a clear harmonic structure over regions around the first formant and often the second formant too. From this analysis, we determined firstly that harmonic structure in noisy speech is observable only in localised regions of the spectrum and secondly, these regions are concentrated at lower frequencies. The standard cepstrum gives as much weight to long-range correlations across the spectrum (i.e. separations of many harmonics) as to the local harmonic structure that the eye can easily spot. However, the long-range correlations offer much more opportunity for spurious correlations in noise, while they are less sensitive to the real harmonic structure when $F_o$ is varying; if $F_o$ changes by d Hz the change in separation between the mth and (n+m)th harmonics will be n.d Hz.

Therefore a need exists for methods of detecting harmonic structure that are not so susceptible to the errors encountered in the cepstrum processing described above, and which preferably carry out a local analysis of the spectrum of the signal.

SUMMARY OF THE INVENTION

Accordingly, in one aspect this invention provides a method for digitally processing input data to determine an estimate of the periodicity of a waveform represented by said data, which method comprises processing said input data to obtain log power spectrum data representing a log power spectrum of said input data, applying an autocorrelation function to said log power spectrum data to obtain autocorrelation data, and thereby determining an estimate of the periodicity of said waveform.

The log power spectrum data may conveniently be obtained by computing the complex Fourier Transform of the input data and using the Fourier Transform data to determine the log power spectrum data.

The log power spectrum data may be thresholded before the application of said autocorrelation function.

Likewise, particularly where the spectrum is not flat, the log power spectrum data may be differenced before the application of said autocorrelation function, to remove the gross envelope structure.

The autocorrelation function is preferably of limited order selected to confine the search for periodicity to spans of up to about 400–500 Hz. For telephone speech at least, it is preferably derived from the lowest 1.5 KHz of the log power spectrum.

These limits may however be adjusted as required for data with different channel characteristics.

The estimate of periodicity is preferably determined by applying a cosine transform to the autocorrelation data to obtain data representing a pseudo-cepstrum and thereafter determining the height and/or frequency of the greatest peak in the cosine transform.

The height of the greatest peak in the cepstrum may be used as an indicator of the signal quality.

To improve the precision with which the peak height and location are determined in the pseudo-cepstrum data, the autocorrelation data is preferably extended and padded with zeroes. Alternatively, an interpolation routine may be carried out on the pseudo-cepstrum data, without padding or extension, by applying a curve-fitting or other suitable technique to the data points.

Where the indication of frequency value represented by the peak in the pseudo-cepstrum is not sufficiently precise, the frequency value may be refined by applying a cepstrum processing technique (without autocorrelation) to the input data and monitoring the cepstrum in the region of said frequency value to determine a refined value for the frequency of the peak.

The invention also extends to apparatus for digitally processing input data to determine an estimate of the periodicity of said waveform, said apparatus comprising input means for data, processing means for processing data from said input means to obtain log power spectrum data representative of a log power spectrum of said input data, autocorrelation means for autocorrelating said log power spectrum data, and means responsive to said autocorrelation data to determine an estimate of the periodicity of said waveform.

BRIEF DESCRIPTION OF THE DRAWINGS

The invention will now be described in detail, reference being made to the accompanying drawings in which.

DESCRIPTION OF THE PREFERRED EMBODIMENTS

Figure 2A:
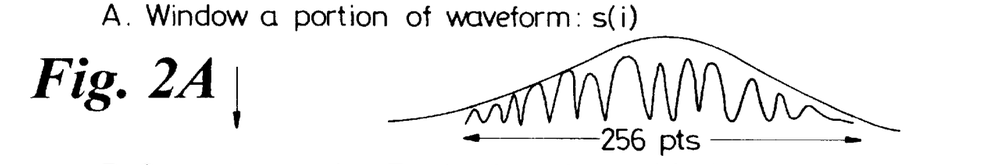
FIGS. 2A–2I represent a schematic flow diagram illustrating a method of determining the periodicity of a waveform in accordance with the invention.
Figure 2B:
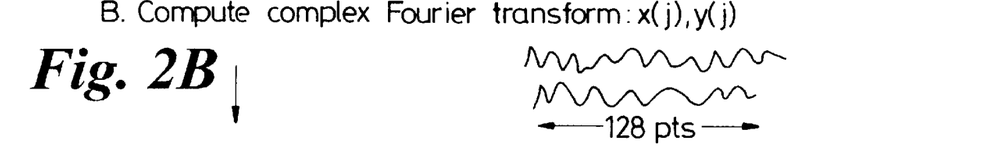

Referring initially to FIG. 2A, digital input data representing a waveform sampled at 8 KHZ from a voice channel is first windowed to select 256 data points from the waveform. A complex Fourier Transform is computed in FIG. 2B to give real and complex Transforms each of 128 data points.

Figure 2C:
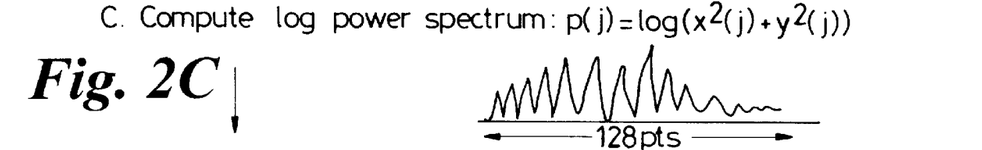
Figure 2D:
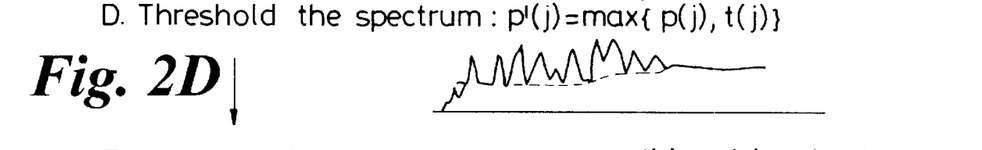
Figure 2E:
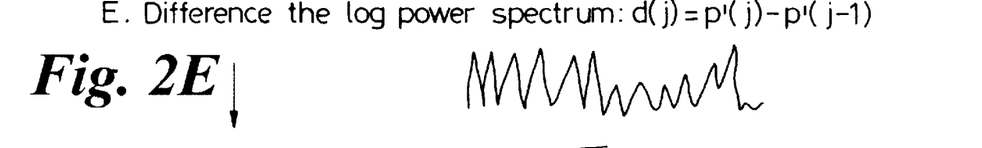
Figure 2F:
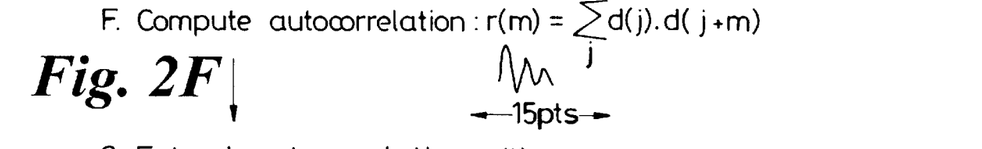

The log power spectrum is taken in FIG. 2C by taking the log of the sum of the squares of the Real and Complex transforms to give a log spectrum of 128 data points. The spectrum is thresholded in FIG. 2D and then differenced with respect to frequency in FIG. 2E to remove the gross envelope structure. A 14th order autocorrelation analysis is then applied to the spectrum in FIG. 2F covering the frequency range up to 1.5 KHz. In this particular example, with a sampling frequency of 8 KHz, and a spectrum of 128 data points, the fourteenth-order autocorrelation analysis r(0) to r(14) confines the search for periodicity to spans of about 430 Hz.

The multiplication involved in the autocorrelation effectively gives more weight to the parts of the spectrum where activity is high, which should further enhance the discrimination between real and spurious data.

Figure 2G:
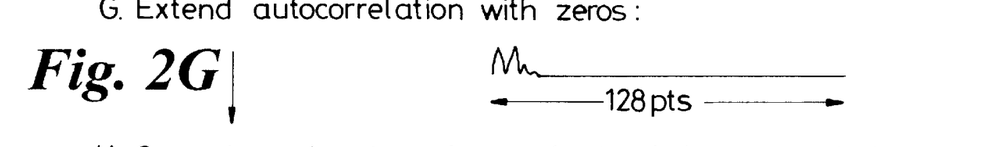
Figure 2H:
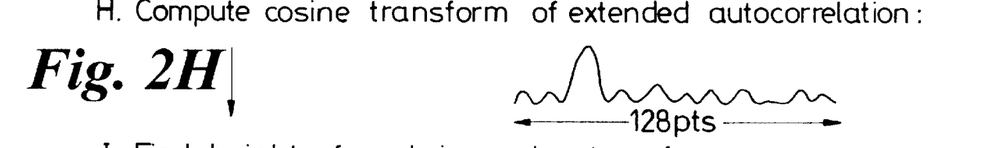
Figure 2I:
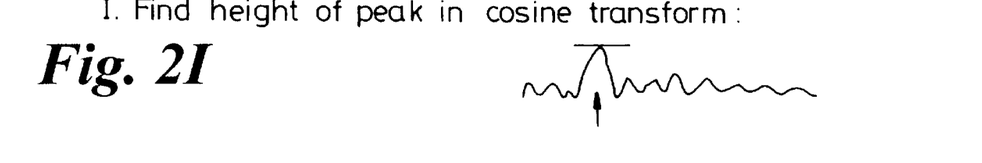
Figure 3:
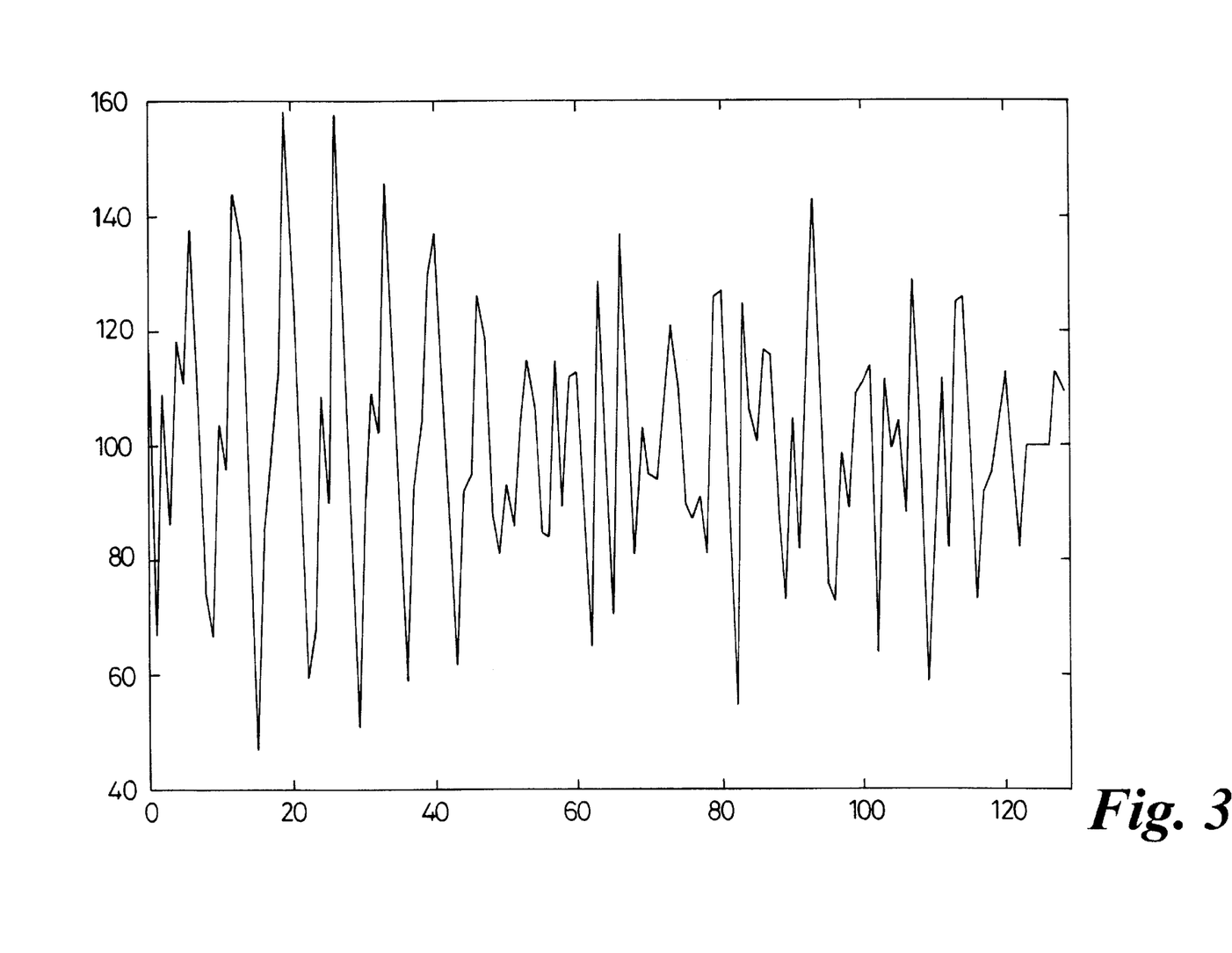
FIG. 3 is a graph of test data of a differenced log power spectrum corresponding to the trace illustrated schematically in FIG. 2E.

The autocorrelation of 15 data points is then padded out with zeroes to 128 points in FIG. 2G and a cosine transformation applied in FIG. 2H. The padding with zeroes avoids the need to interpolate the curve from the cosine transformation. The limited order of the autocorrelation and the limited frequency range may mean that the frequency $F_o$ cannot be determined with the precision that would otherwise be possible with a good quality signal. However, the main aim is to make a voicing decision, and so the existence and height of the peak is of more significance initially than its exact location.

In tests, the method described above discriminated between voiced and voiceless speech on all the test data used, including data with 0 dB SNR.

The peak height depends on signal quality, and can be used as an indicator of signal quality, though only in the frequency range over which the autocorrelation is carried out. A comparison of FIG. 1, which shows a trace obtained by cepstrum processing applied to input data, and FIG. 4 which shows a trace obtained by the method of the present invention performed on the same input data illustrates that the method of the present invention provides a much clearer, unambiguous indication of periodicity.

In the above example, parameters such as the frequency range, the order of the autocorrelation and the thresholds applied to the spectrum have been roughly optimized on a limited amount of data. The optimal settings may well be somewhat different for data with different channel characteristics.

Figure 4:
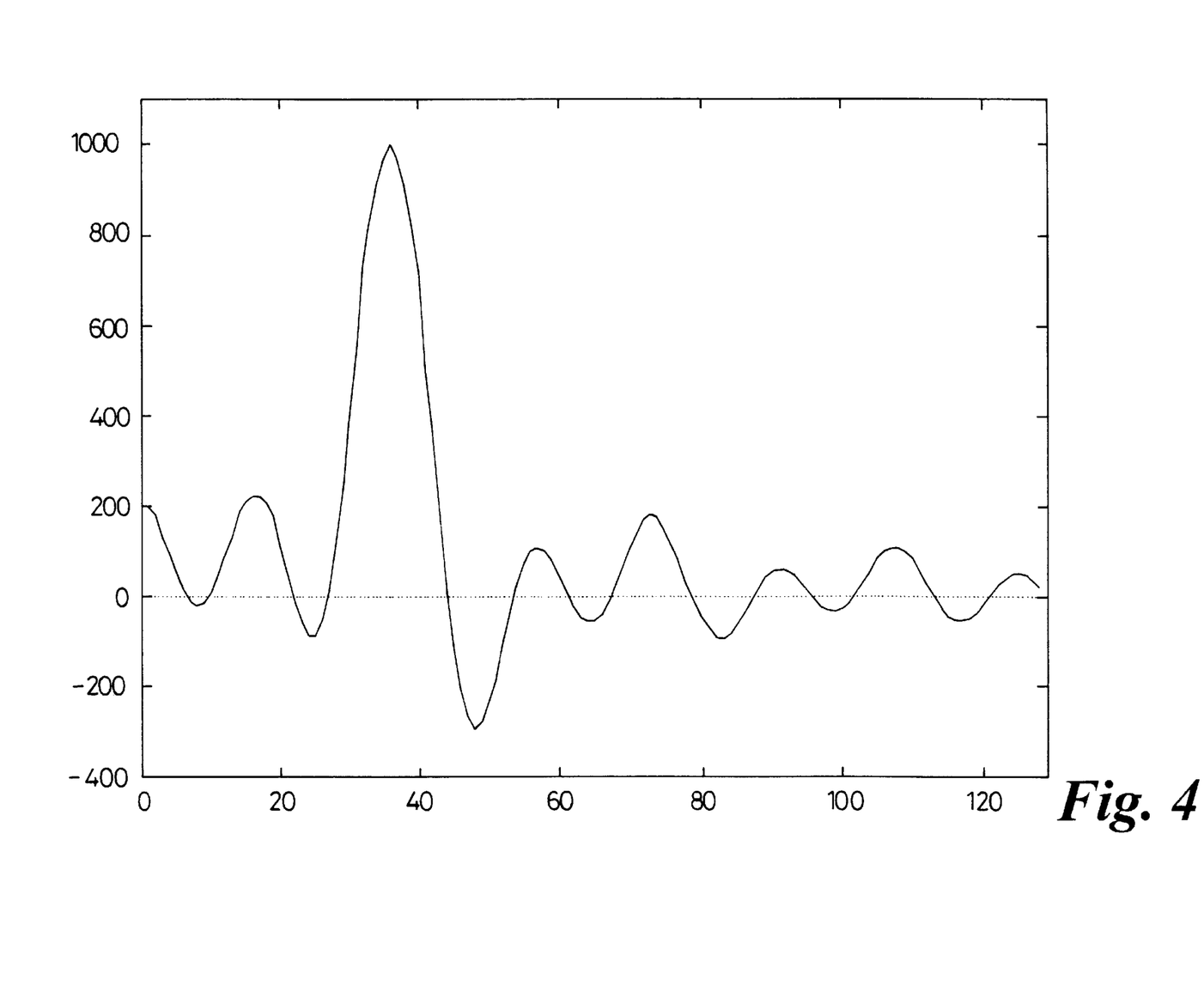
FIG. 4 is a graph of test data of the cosine transform of the extended autocorrelation illustrated schematically in FIGS. 2H and 2I.

For precise location of the peak in the above example, having obtained the data of FIG. 4, which give a first estimate of the location of the peak, the first estimate may be refined by applying conventional cepstrum processing to the input data and monitoring the cepstrum for peaks in the region of said first estimate.

Thus in the above example, having obtained the first estimate from FIG. 4, the data of FIG. 1 could be computed and the exact position of the peak in FIG. 1 corresponding to that of FIG. 4 noted and its frequency determined.

Figure 5:
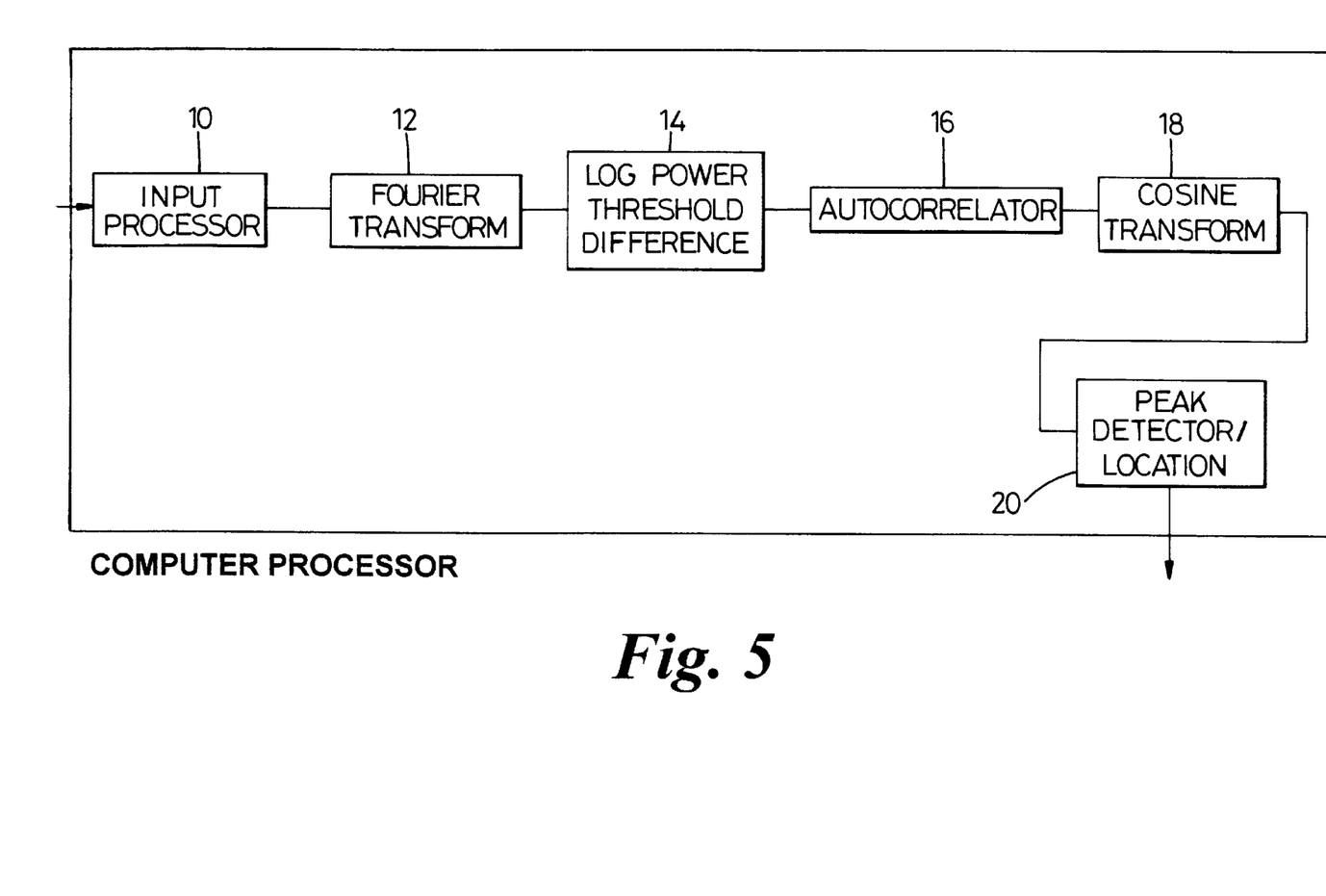
FIG. 5 is a schematic block diagram view of a computer processor apparatus in accordance with this invention.
Figure 6:
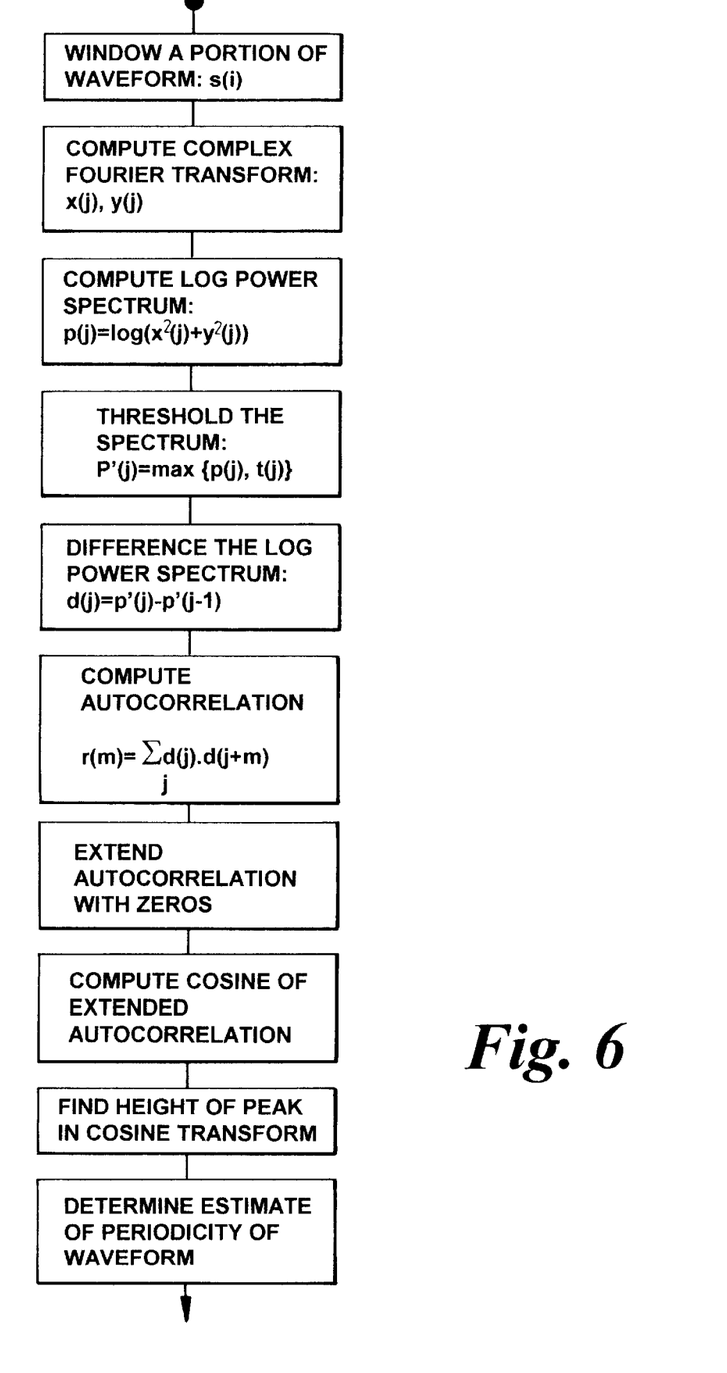
FIG. 6 is a flow chart illustrating a method for determining periodicity of a waveform according to the present invention.

In FIG. 5, the apparatus according to this invention in the form of a computer processor includes an input signal processor 10 for receiving the waveform. The data then passes to a Fourier Transform processor 12 and thence to a log power processor 14 which computes the log power spectrum and then thresholds the spectrum and differences it with respect to frequency. Thereafter the data passes to an autocorrelator 16 followed by a cosine transform processor 18 and thence to a peak detector and location processor 20 which provides an output indicating the height of the peak, its location and a measure of the signal energy.

I claim:

1. A method of using a computer processor to analyze electrical signals and input data representative of sounds to determine the periodicity of a waveform represented by said data, which method comprises using the computer processor to process said input data to obtain log power spectrum data representing a log power spectrum of said input data, using the computer processor to apply an autocorrelation function of limited order to said log power spectrum data to obtain autocorrelation data, and thereby determining an estimate of the periodicity of said waveform.

2. A method according to claim 1, wherein said step of processing said input data includes computing the complex Fourier Transform of the input data and thereafter computing the log power spectrum.

3. A method according to claim 1, wherein said log power spectrum data is thresholded before application of said autocorrelation function.

4. A method according to claim 1, wherein said log power spectrum data is differenced before application of said autocorrelation function.

5. A method according to claim 1, wherein the said limited order of the autocorrelation function corresponds to searches for periodicity to spans of up to above 400–500 Hz.

6. A method according to claim 1, wherein said step of determining an estimate of the periodicity includes computing the cosine transform of said autocorrelation data and thereafter determining at least one of a height and frequency of a greatest peak in said cosine transform.

7. A method according to claim 6, wherein the height of the greatest peak is used as an indicator of the speech-related harmonicity.

8. A method according to claim 6, wherein the autocorrelation data is extended with zeroes before computing said cosine transform.

9. A method according to claim 1, wherein, having determined an estimate of the periodicity of said waveform, said estimate is refined by applying a cepstrum processing technique to said input data to obtain cepstrum data and monitoring said cepstrum data in the neighbourhood corresponding to said estimate to obtain a refined estimate.

10. Apparatus for digitally processing input data representative of sounds to estimate periodicity of a waveform of the input data, said apparatus comprising:

input means for inputting the input data representative of sounds in the form of electrical signals, processing means comprising a computer processor for processing the input data from said input means to obtain log power spectrum data representative of a log power spectrum of said input data, autocorrelation means comprising the computer processor for autocorrelating said log spectrum data; and means responsive to said autocorrelation data comprising the computer processor to determine an estimate of the periodicity of said waveform.

* * * * *

UNITED STATES PATENT AND TRADEMARK OFFICE
CERTIFICATE OF CORRECTION

PATENT NO. : 5,809,453
DATED : September 15, 1998
INVENTOR(S) : Melvyn John HUNT It is certified that error appears in the above-indentified patent and that said Letters Patent is hereby corrected as shown below:

Column 5, line 24 (Claim 5, line 3), change "above" to --about--.

Signed and Sealed this

Twenty-fourth Day of August, 1999

Q. TODD DICKINSON

*Attest:*

*Attesting Officer*    *Acting Commissioner of Patents and Trademarks*